(12) United States Patent
Sourov

(10) Patent No.: US 12,400,650 B2
(45) Date of Patent: Aug. 26, 2025

(54) MEDIA CONTROL TOOLS FOR MANAGING COMMUNICATIONS BETWEEN DEVICES

(71) Applicant: Alexander Sourov, Seattle, WA (US)

(72) Inventor: Alexander Sourov, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 336 days.

(21) Appl. No.: 17/963,541

(22) Filed: Oct. 11, 2022

(65) Prior Publication Data
US 2024/0119928 A1    Apr. 11, 2024

(51) Int. Cl.
| | | |
|---|---|---|
| G10L 15/00 | (2013.01) | |
| G06F 40/58 | (2020.01) | |
| G06V 20/40 | (2022.01) | |
| G06V 40/20 | (2022.01) | |
| G10L 15/08 | (2006.01) | |
| G10L 15/22 | (2006.01) | |
| G10L 15/24 | (2013.01) | |
| G10L 25/57 | (2013.01) | |

(52) U.S. Cl.
CPC .............. *G10L 15/22* (2013.01); *G06F 40/58* (2020.01); *G06V 20/40* (2022.01); *G06V 40/20* (2022.01); *G10L 15/08* (2013.01); *G10L 15/24* (2013.01); *G10L 25/57* (2013.01); *G10L 2015/088* (2013.01); *G10L 2015/223* (2013.01)

(58) Field of Classification Search
CPC ......... G10L 15/22; G10L 15/08; G10L 15/24; G10L 25/57; G10L 2015/088; G10L 2015/223; G10L 15/26; G10L 25/51; G06F 40/58; G06F 1/163; G06V 20/40; G06V 40/20; G02B 27/017; G02B 2027/0178; G02B 2027/0138; G02B 2027/0187; G02B 27/01

See application file for complete search history.

(56) References Cited

U.S. PATENT DOCUMENTS

| | | |
|---|---|---|
| 11,277,597 B1 | 3/2022 | Canberk et al. |
| 2014/0275760 A1 | 9/2014 | Lee et al. |

(Continued)

FOREIGN PATENT DOCUMENTS

| | | |
|---|---|---|
| KR | 102067089 B1 | 1/2020 |
| WO | 2022035110 A1 | 2/2022 |

OTHER PUBLICATIONS

Chen, L., Tang, W., John, N., Wan, T. R., & Zhang, J. J. (2018). Context-aware mixed reality: A framework for ubiquitous interaction. arXiv preprint arXiv:1803.05541. (Year: 2018).*

(Continued)

*Primary Examiner* — Edgar X Guerra-Erazo
(74) *Attorney, Agent, or Firm* — CM Law; Stephen J. Weed

(57) ABSTRACT

Media control tools for controlling communications between devices are described. A communications application allows a user to selectively signal another device to interrupt a presentation in progress on the other device, and to send a prioritized speech to the other device in accordance with a media priority. The prioritized speech may be translated and presented in a select language. The application detects an interrupt command, such as a keyword or a gesture, which is associated with a particular other device. The presentation resumes after a continue condition is detected.

17 Claims, 13 Drawing Sheets

(56) References Cited

U.S. PATENT DOCUMENTS

| | | | |
|---|---|---|---|
| 2015/0058023 A1* | 2/2015 | Goo | G10L 15/005 704/277 |
| 2018/0185100 A1 | 7/2018 | Weinstein et al. | |
| 2019/0302460 A1 | 10/2019 | Kaul et al. | |
| 2019/0324530 A1 | 10/2019 | Stellmach et al. | |
| 2020/0221155 A1* | 7/2020 | Hansen | H04N 21/4131 |
| 2020/0342228 A1 | 10/2020 | Prevrhal et al. | |
| 2021/0121271 A1 | 4/2021 | Kopelman et al. | |
| 2021/0224031 A1* | 7/2021 | Nair | G06F 3/167 |
| 2021/0375048 A1 | 12/2021 | Kang et al. | |
| 2021/0407203 A1 | 12/2021 | Canberk et al. | |
| 2022/0108696 A1* | 4/2022 | van Scheltinga | G10L 15/083 |
| 2022/0168044 A1 | 6/2022 | Oliveira | |
| 2022/0168051 A1 | 6/2022 | Ryan et al. | |
| 2022/0244786 A1* | 8/2022 | Chu | G06F 3/012 |
| 2022/0292780 A1 | 9/2022 | Kang et al. | |
| 2024/0000295 A1 | 1/2024 | Smith et al. | |
| 2024/0377640 A1 | 11/2024 | Asaban et al. | |

OTHER PUBLICATIONS

A. Bhuiyan, M. A. Islam, M. H. Shahriar, T. H. Supto, M. A. Kasem and M. E. Daud, "An Assistance System for Visually Challenged People Based on Computer Vision and IOT," 2020 IEEE Region 10 Symposium (TENSYMP), Dhaka, Bangladesh, 2020, pp. 1359-1362 (Year: 2020).*

Bichlmeier, Christoph, et al. "Contextual anatomic mimesis hybrid in-situ visualization method for improving multi-sensory depth perception in medical augmented reality." 2007 6th IEEE and ACM international symposium on mixed and augmented reality. IEEE, 2007. (Year 2007).

International Search Report and Written Opinion for International Application No. PCT/US2023/028171, dated Nov. 21, 2023 (Nov. 21, 2023)—9 pages.

International Search Report and Written Opinion for International Application No. PCT/US2023/028251, dated Jul. 20, 2023 (Jul. 20, 2023)—8 pages.

* cited by examiner

MEDIA CONTROL TOOLS FOR MANAGING COMMUNICATIONS BETWEEN DEVICES

TECHNICAL FIELD

Examples set forth in the present disclosure relate to the field of augmented reality (AR) experiences for electronic devices, including portable electronic devices and wearable devices such as eyewear. More particularly, but not by way of limitation, the present disclosure describes communications applications that enable users to selectively interrupt a presentation in progress on another electronic device and transmit spoken content according to a media priority.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays. Users sometimes refer to information on these devices during physical activities such as exercise.

Automatic speech recognition (ASR) is a field of computer science, artificial intelligence, and linguistics which involves receiving spoken words and converting the spoken words into audio data suitable for processing by a computing device. Human speech received as an analog audio signal can be converted to a digital audio signal and analyzed using ASR to identify the discrete words in the speech. Speech received in a first language can be translated into a second language. The identified words can be used to execute actions or commands which are useful in controlling and interacting with computer software applications. ASR processing may be used by computers, handheld devices, wearable devices, telephone systems, automobiles, and a wide variety of other devices to facilitate human-computer interactions.

Virtual reality (VR) technology generates a complete virtual environment including realistic images, sometimes presented on a VR headset or other head-mounted display. VR experiences allow a user to move through the virtual environment and interact with virtual objects. AR is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added upper or lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
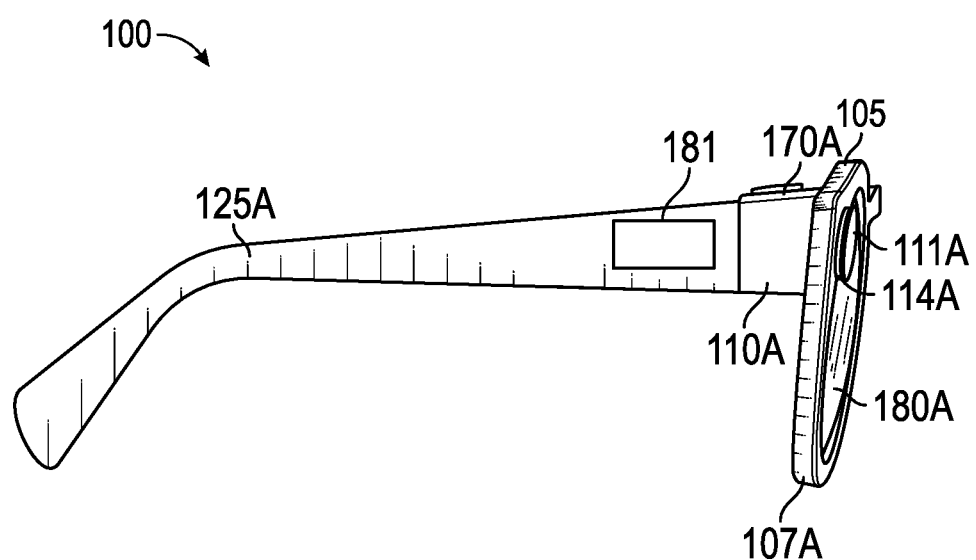
FIG. 1A is a side view (right) of an eyewear device suitable for use in an example communications system.

A communications system for use with portable electronic devices, including wearable devices such as electronic eyewear devices. The communications system enables a user (e.g., a dentist or an instructor) wearing an eyewear device to selectively interrupt a presentation in progress on another device (e.g., an eyewear device worn by a patient or student) and to transmit spoken content to the other device according to a media priority.

Various implementations and details are described with reference to examples for controlling communications between portable electronic devices. In an example implementation, a method involves identifying a prioritized speech within speech received using a microphone coupled to an electronic eyewear device. The prioritized speech is associated with a media priority. The example method further includes signaling another device to interrupt a presentation in progress on the other device, according to the media priority, and then sending the prioritized speech for presentation on the other device. The prioritized speech in some implementations includes or is preceded by an interrupt command (e.g., a spoken keyword, a gesture, or other input). When completed, the prioritized speech includes or is followed by a continue condition (e.g., a spoken closing term, a closing gesture, a quiet duration, or other input). The example method in some implementations includes translating the prioritized speech into a select language.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. The recognition and tracking in real time of body parts, such as hands and fingers, arms and legs, and feet is one of the most challenging and processing-intensive tasks in the field of computer vision.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In sample configurations, eyewear devices with augmented reality (AR) capability are used in the systems described herein. Eyewear devices are desirable to use in the system described herein as such devices are scalable, customizable to enable personalized experiences, enable effects to be applied anytime, anywhere, and ensure user privacy by enabling only the user to see the transmitted information. An eyewear device such as SPECTACLES™ available from Snap, Inc. of Santa Monica, California, may be used without any specialized hardware in a sample configuration.

As shown in FIGS. 1A-1D, the illustrated eyewear device 100 includes a camera 114A and another camera 114B. The cameras 114 capture image information for a scene from separate viewpoints. The captured images may be used to project a three-dimensional display onto an image display for three dimensional (3D) viewing.

Figure 3:
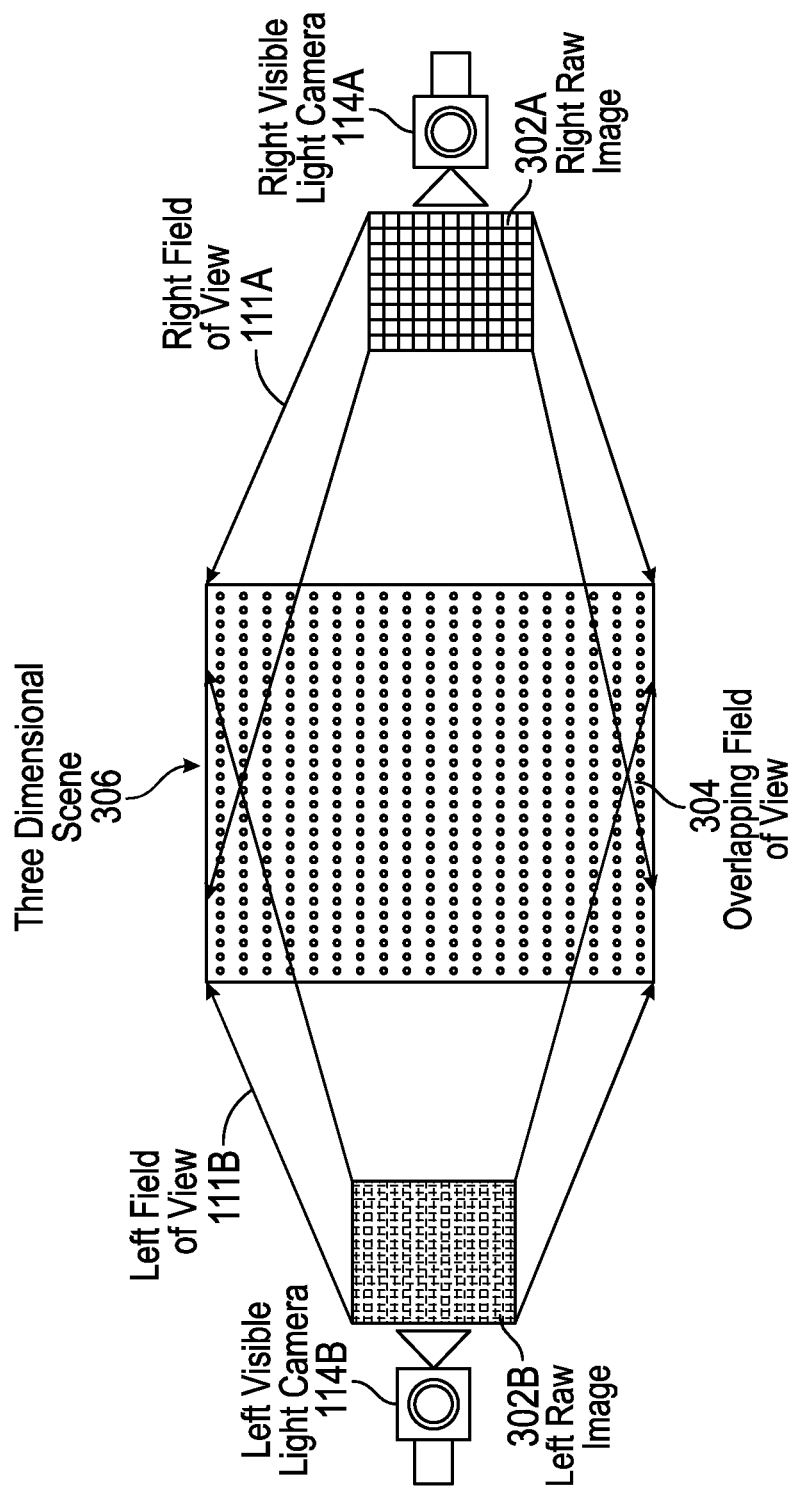
FIG. 3 is a block diagram illustrating an example of capturing visible light using an example eyewear device illustrated in any of the proceeding figures.

The cameras 114 are sensitive to the visible-light range wavelength. Each of the cameras 114 define a different frontward facing field of view, which are overlapping to enable generation of 3D depth images; for example, the camera 114A defines a field of view 111A and the other camera 114B defines another field of view 111B. Generally, a "field of view" is the part of the scene that is visible through the camera at a particular position and orientation in space. The fields of view 111 have an overlapping field of view 304 (FIG. 3). Objects or object features outside the field of view 111 when the camera captures the image are not recorded in a raw image (e.g., photograph or picture). The field of view describes an angle range or extent from which the image sensor of the camera 114 picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both cameras 114 has a field of view of 100° and a resolution of 480×480 pixels or greater. The "angle of coverage" describes the angle range that a lens of the cameras 114 can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of suitable cameras 114 include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include cameras 114 that can capture high-definition (HD) video at a high frame rate (e.g., thirty to sixty frames per second, or more) and store the recording at a resolution of 1216 by 1216 pixels (or greater).

The eyewear device 100 may capture image sensor data from the cameras 114 along with geolocation data, digitized by an image processor, for storage in a memory. The cameras 114 capture respective raw images (e.g., left and right raw images) in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a 3D projection, the image processor 412 (FIG. 4) may be coupled to the cameras 114 to receive and store the visual image information. The image processor 412, or another processor, controls operation of the cameras 114 to act as a stereo camera simulating human binocular vision and may add a timestamp to each image. The timestamp on each pair of images allows display of the images together as part of a 3D projection. 3D projections produce an immersive, life-like experience that is desirable in a variety of contexts, including virtual reality (VR) and video gaming.

Figure 1B:
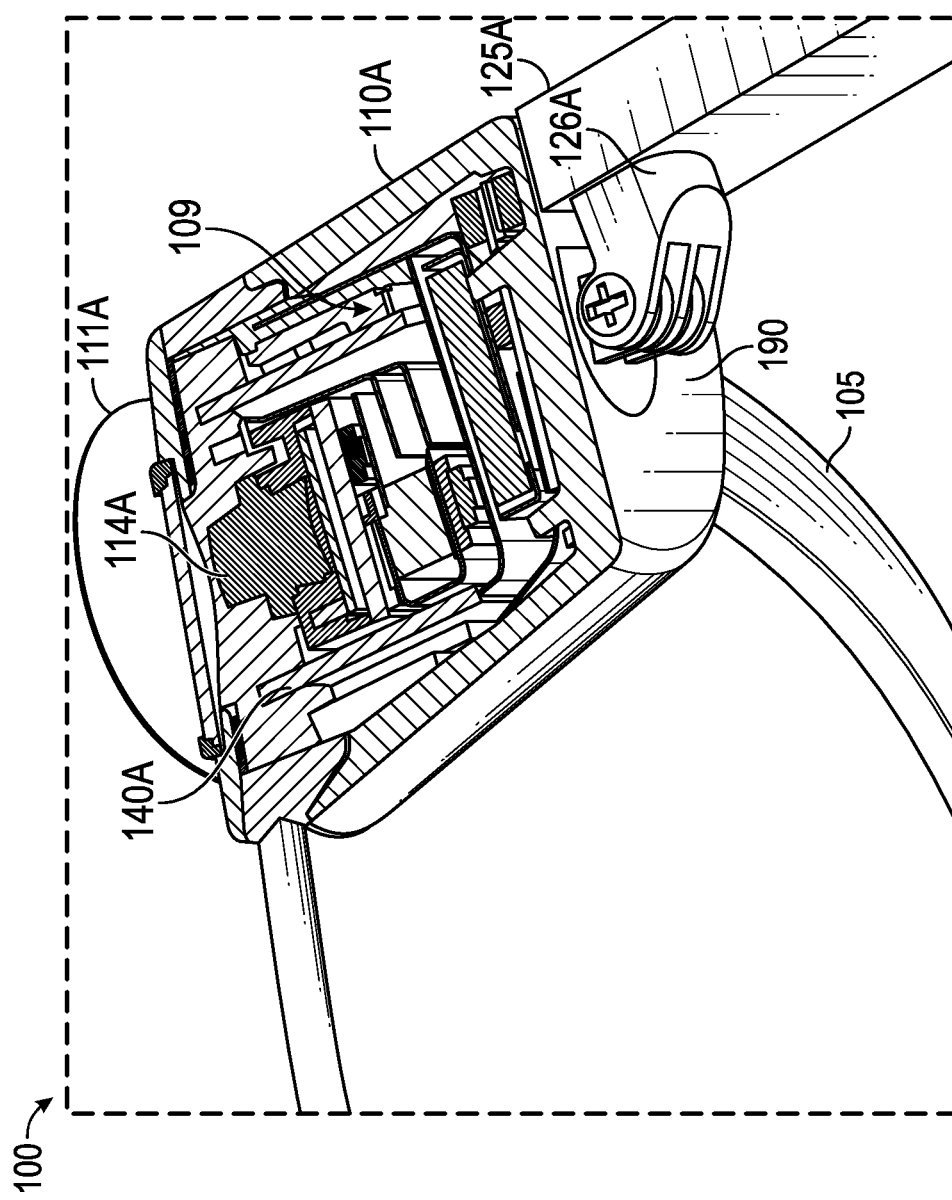
FIG. 1B is a perspective, partly sectional view of optical components and electronics in a portion of the eyewear device illustrated in FIG. 1A.
Figure 1C:
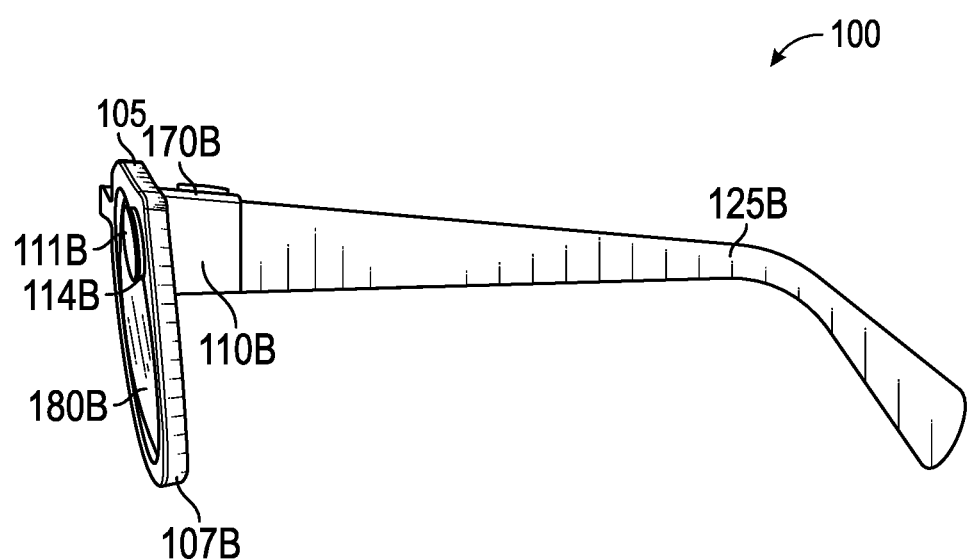
FIG. 1C is a side view (left) of the eyewear device of FIG. 1A.
Figure 1D:
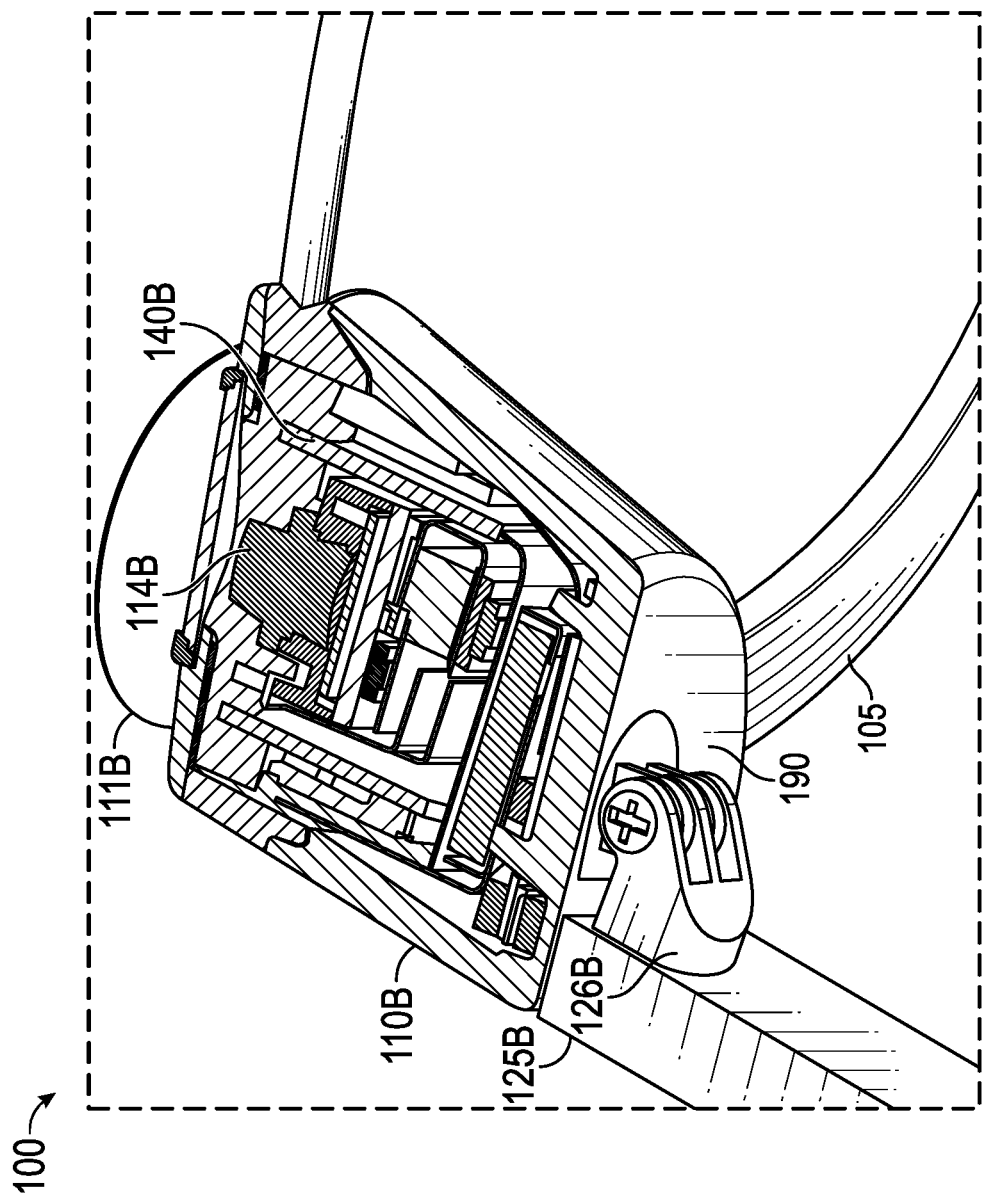
FIG. 1D is a perspective, partly sectional view of optical components and electronics in a portion of the eyewear device illustrated in FIG. 1C.

FIG. 1B is a perspective, cross-sectional view of a corner 110A (right corner) of the eyewear device 100 of FIG. 1A depicting the camera 114A, additional optical components, and electronics. FIG. 1C is a side view (left) of an example hardware configuration of an eyewear device 100 of FIG. 1A, which shows the other camera 114B of the camera system. FIG. 1D is a perspective, cross-sectional view of another corner 110B (left corner) of the eyewear device 100 of FIG. 1C depicting the other camera 114B of the camera system, additional optical components, and electronics.

As shown in the example of FIG. 1B, the eyewear device 100 includes the camera 114A and a circuit board 140A, which may be a flexible printed circuit board (PCB). A hinge 126A connects the corner 110A to a temple 125A of the eyewear device 100. In some examples, components of the camera 114A, the flexible PCB 140A, or other electrical connectors or contacts may be located on the temple 125A or the hinge 126A.

The corner 110A includes corner body 190 and a corner cap, with the corner cap omitted in the cross-section of FIG. 1B. Disposed inside the corner 110A are various interconnected circuit boards 109, such as the flexible PCB 140A, that include controller circuits for the camera 114A, microphone(s) 139 (FIG. 2A), speaker(s) 191 (FIG. 2A), low-power wireless circuitry (e.g., for wireless short range network communication via Bluetooth™), high-speed wireless circuitry (e.g., for wireless local area network communication via Wi-Fi).

Figure 2A:
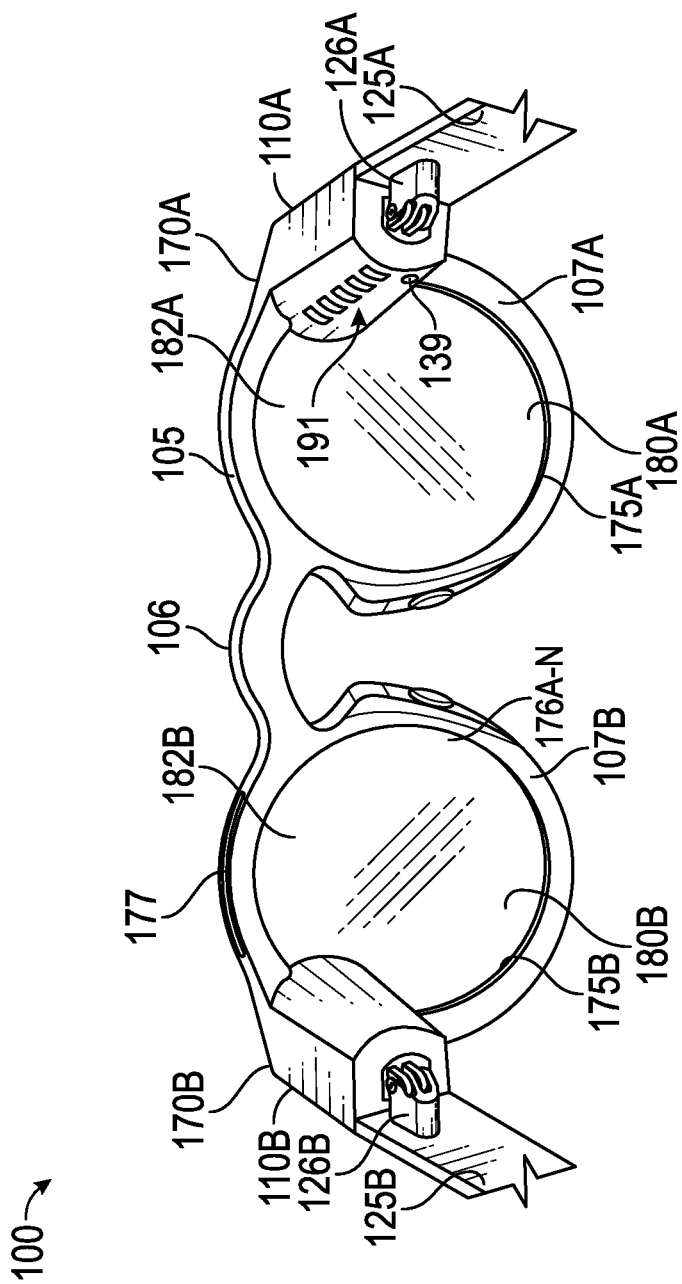
FIGS. 2A and 2B are rear views of an eyewear device utilized in an example communications system.

The camera 114A is coupled to or disposed on the flexible PCB 140A and is covered by a camera cover lens, which is aimed through opening(s) formed in the frame 105. For example, the rim 107A of the frame 105, shown in FIG. 2A, is connected to the corner 110A and includes the opening(s) for the camera cover lens.

As shown in the example of FIG. 1D, the eyewear device 100 includes the other camera 114B and a circuit board 140B, which may be a flexible printed circuit board (PCB). Another hinge 126B connects the corner 110B to another temple 125B of the eyewear device 100. In some examples, components of the other camera 114B, the flexible PCB 140B, or other electrical connectors or contacts may be located on the other temple 125B or the other hinge 126B.

The other corner 110B includes corner body 190 and a corner cap, with the corner cap omitted in the cross-section of FIG. 1D. Disposed inside the other corner 110B are various interconnected circuit boards, such as the flexible PCB 140B, that include controller circuits for the other camera 114B.

The cameras 114 are coupled to or disposed on respective flexible PCBs 140 and are covered by respective camera cover lens, which are aimed through opening(s) formed in the frame 105. For example, as shown in FIG. 2A, the rim 107A of the frame 105 is connected to the corner 110A and includes the opening(s) for the camera cover lens and the other rim 107B of the frame 105 is connected to the other corner 110B and includes the opening(s) for the other camera cover lens. The frame 105 includes a front side configured to face outward and away from the eye of the user. The opening for the camera cover lens is formed on and through the front or outward-facing side of the frame 105. In the example, the cameras 114 have respective outward-facing fields of view 111 (shown in FIG. 3) with a line of sight or perspective that is correlated with a respective eye of the user of the eyewear device 100. The camera cover lenses can also be adhered to a front side or outward-facing surface of the respective corners 110 in which an opening is formed with an outward-facing angle of coverage, but in a different outwardly direction. The coupling can also be indirect via intervening components.

Figure 2B:
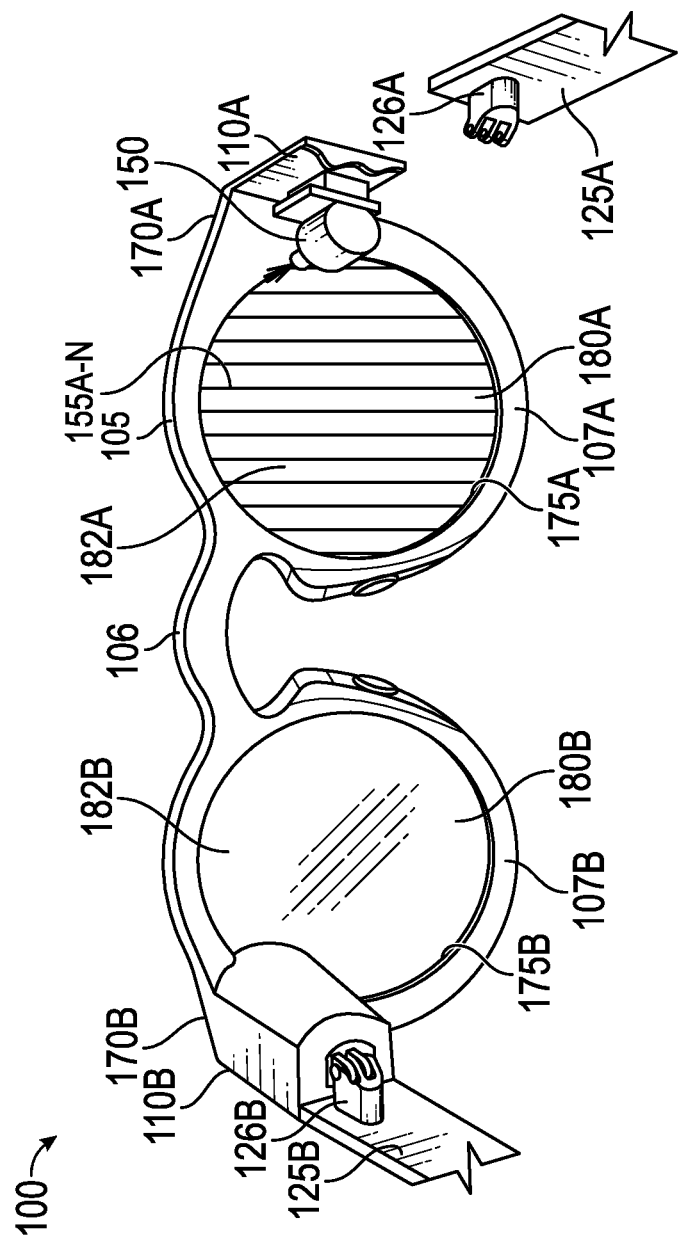

FIGS. 2A and 2B depict example hardware configurations of the eyewear device 100, including two different types of image displays. The eyewear device 100 is sized and shaped in a form configured for wearing by a user. The form of eyeglasses is shown in the illustrated examples. The eyewear device 100 can take other forms and may incorporate other types of frameworks; for example, a headgear, a headset, or a helmet.

In the eyeglasses example, eyewear device 100 includes a frame 105 including a rim 107A (right) connected to another rim 107B (left) via a bridge 106 configured to receive a nose of the user to support the eyewear device 100 on the user's head. The rim 107A includes an aperture 175A, which holds an optical element 180A. The other rim 107B includes another aperture 175B, which holds another optical element 180B. As shown in FIG. 2B, each optical element 180A, 180B in some implementations includes an integrated image display (e.g., a display 182A and another display 182B). As used herein, the term "lens" is meant to include transparent or translucent pieces of glass or plastic having curved or flat surfaces that cause light to converge or diverge or that cause little or no convergence or divergence.

A touch-sensitive input device, such as a touchpad 181 is positioned on the temple 125A. As shown, the touchpad 181 may have a boundary that is plainly visible or includes a raised or otherwise tactile edge that provides feedback to the user about the location and boundary of the touchpad 181; alternatively, the boundary may be subtle and not easily seen or felt. The eyewear device 100 may include a touchpad on the other side that operates independently or in conjunction with the touchpad 181.

The surface of the touchpad 181 is configured to detect finger touches, taps, and gestures (e.g., moving touches) for use with a graphical user interface (GUI) displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180. Tapping or double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be positioned essentially anywhere on the eyewear device 100.

In one example, an identified finger gesture of a single tap on the touchpad 181, initiates selection or pressing of a GUI element in the image presented on the image display of the optical assembly 180. An adjustment to the image presented on the image display of the optical assembly 180 based on the identified finger gesture can be a primary action which selects or submits the GUI element on the image display of the optical assembly 180 for further display or execution.

The corner 110A supports a microphone 139 and a speaker 191. The microphone 139 includes a transducer that converts sound into a corresponding electrical audio signal. The microphone 139 in the illustrated example is positioned with an opening that faces inward toward the wearer, to facilitate reception of the sound waves, such as human speech including verbal commands and questions. Additional or differently oriented openings may be implemented. In other example configurations, the eyewear device 100 is coupled to one or more microphones 139, configured to operate together or independently, and positioned at various locations on the eyewear device 100.

Figure 4:
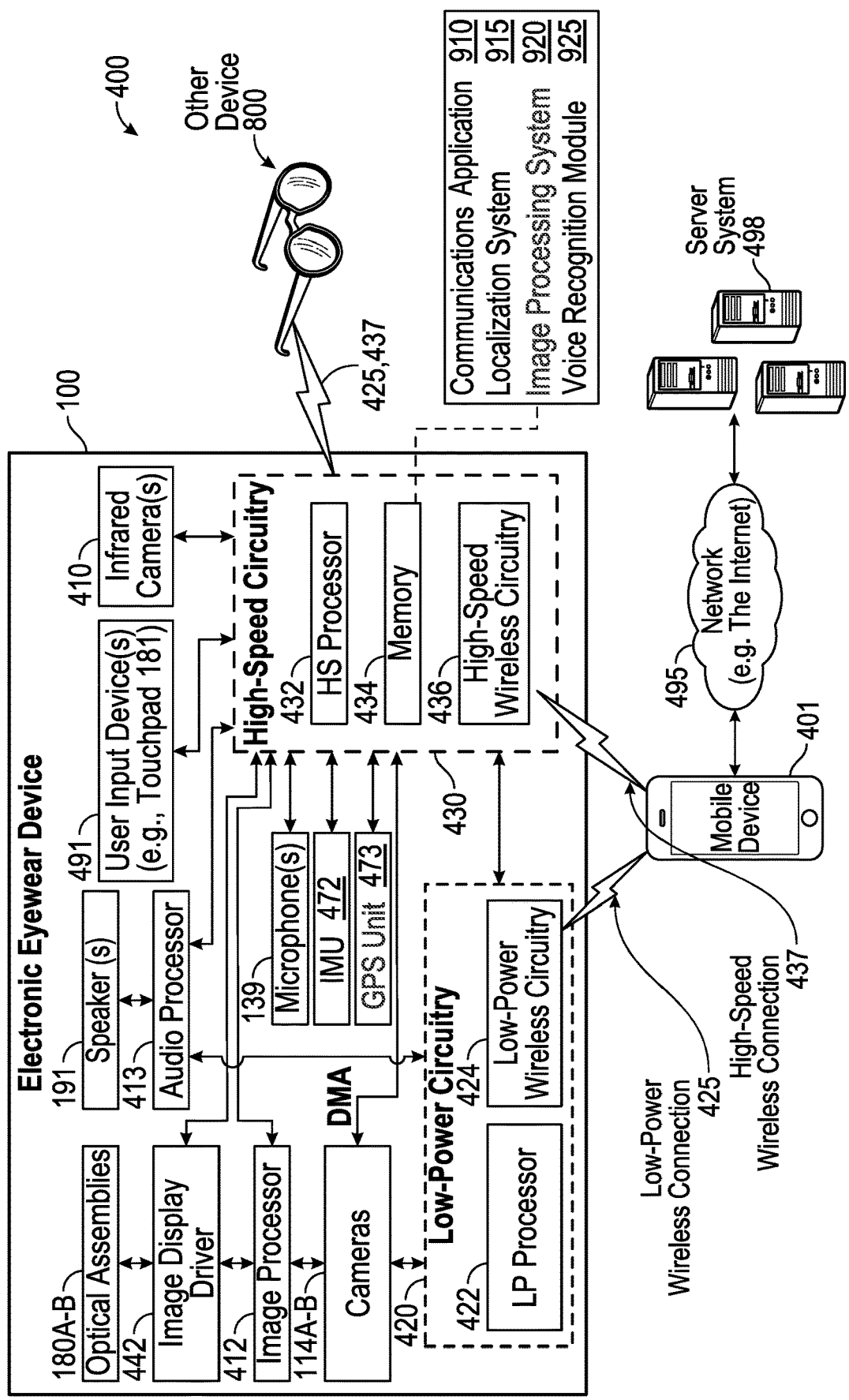
FIG. 4 is a functional block diagram of an example communications system including an electronic eyewear device, another device, a mobile device, and a server system connected via various networks.

The speaker 191 includes an electro-acoustic transducer that converts an electrical audio signal into a corresponding sound. The speaker 191 is controlled by one of the processors 422, 432 or by an audio processor 413 (FIG. 4). The speaker 191 in this example includes a series of oblong apertures, as shown, that face inward to direct the sound toward the wearer. Additional or differently oriented apertures may be implemented. In other example configurations, the eyewear device 100 is coupled to one or more speakers 191, configured to operate together (e.g., in stereo, in zones to generate surround sound) or independently, and positioned at various locations on the eyewear device 100. For example, one or more speakers 191 may be incorporated into the frame 105, temples 125, or corners 110 of the eyewear device 100.

Although shown in FIG. 2A and FIG. 2B as having two optical elements 180, the eyewear device 100 can include other arrangements, such as a single optical element (or it may not include any optical element 180), depending on the application or the intended user of the eyewear device 100. As further shown, eyewear device 100 includes a corner 110A adjacent a lateral side 170A of the frame 105 and another corner 110B adjacent the other lateral side 170B of the frame 105. The corners 110 may be integrated into the frame 105 on the respective sides 170 (as illustrated) or implemented as separate components attached to the frame 105 on the respective sides 170. Alternatively, the corners 110A, 110B may be integrated into temples (not shown) attached to the frame 105.

In one example, each image display of optical assembly 180 includes an integrated image display (e.g., a display 182A and another display 182B). As shown in FIG. 2A, each optical assembly 180 has a display 182 that includes a suitable display matrix 177, such as a liquid crystal display (LCD), an organic light-emitting diode (OLED) display, or other such display. Each optical assembly 180 also includes an optical layer or layers 176, which can include lenses, optical coatings, prisms, mirrors, waveguides, optical strips, and other optical components in any combination. The optical layers (shown as 176A-N in FIG. 2A) can include a prism having a suitable size and configuration and including a surface for receiving light from a display matrix and another surface for emitting light to the eye of the user. The prism of the optical layers 176A-N extends over all or at least a portion of the respective apertures 175 formed in the rims 107 to permit the user to see the other surface of the prism when the eye of the user is viewing through the corresponding rims 107. The surface of the prism of the optical layers 176A-N faces upwardly from the frame 105 and the display matrix 177 overlies the prism so that photons and light emitted by the display matrix 177 impinge the surface. The prism is sized and shaped so that the light is refracted within the prism and is directed toward the eye of the user by the other surface of the prism of the optical layers 176A-N. In this regard, the other surface of the prism of the optical layers 176A-N can be convex to direct the light toward the center of the eye. The prism can optionally be sized and shaped to magnify the image projected by the display matrix 177, and the light travels through the prism so that the image viewed from the other surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a 3D projection. Technologies other than LCD may be used for the active shutter mode, including other types of reactive layers that are responsive to a voltage or another type of input.

In another example, the image display device of optical assembly 180 has a display 182 that includes a projection image display as shown in FIG. 2B. Each optical assembly 180 includes a respective laser projector 150, such as a three-color laser projector using a scanning mirror or galvanometer. Each laser projector 150 is disposed in or on a respective temples 125 of the eyewear device 100. Each optical assembly 180, in this example, includes one or more optical strips (shown as 155A-N in FIG. 2B), which are spaced apart and across the width of the lens of each optical assembly 180 or across a depth of the lens between the front surface and the rear surface of the lens.

As the photons projected by the laser projector 150 travel across the lens of each optical assembly 180, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals. Although shown as having two optical assemblies 180, the eyewear device 100 can include other arrangements, such as a single or three optical assemblies, or each optical assembly 180 may have different arrangements depending on the application or intended user of the eyewear device 100.

FIG. 3 is a diagrammatic depiction of a 3D scene 306, a raw image 302A captured using the camera 114A, and another raw image 302B captured using the other camera 114B. The field of view 111A may overlap, as shown, with the other field of view 111B. The overlapping fields of view 304 represents that portion of the image captured using both cameras 114. The term 'overlapping' when referring to field of view means the matrix of pixels in the generated raw images overlap by thirty percent (30%) or more. 'Substantially overlapping' means the matrix of pixels in the generated raw images—or in the infrared image of scene— overlap by fifty percent (50%) or more. As described herein, the two raw images 302 may be processed to include a timestamp, which allows the images to be displayed together as part of a three-dimensional projection.

For the capture of stereo images, as illustrated in FIG. 3, a pair of raw red, green, and blue (RGB) images are captured of a 3D scene 306 at a given moment in time—a raw image 302A captured using the camera 114A and another raw image 302B captured using the other camera 114B. When the pair of raw images 302 are processed (e.g., by the image processor 412), depth images are generated. The generated depth images may be viewed on the optical assemblies 180 of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

FIG. 4 is a functional block diagram of an example communications system 400 that includes an eyewear device 100, a mobile device 401, and a server system 498 connected via various networks 495 such as the Internet. As shown, the communications system 400 includes a low-power wireless connection 425 and a high-speed wireless connection 437 between the eyewear device 100 and the mobile device 401.

The eyewear device 100 includes one or more cameras 114 that capture still images, video images, or both still and video images, as described herein. The cameras 114 may have a direct memory access (DMA) to high-speed circuitry 430 and function as a stereo camera. The cameras 114 may be used to capture initial-depth images that may be rendered into three-dimensional (3D) models that are texture-mapped images of a red, green, and blue (RGB) imaged scene. The device 100 may also include a depth sensor that uses infrared signals to estimate the position of objects relative to the device 100. The depth sensor in some examples includes one or more infrared emitter(s) and infrared camera(s) 410.

The eyewear device 100 further includes two image displays of optical assemblies 180 (one associated with the side 170A and one associated with the other side 170B). The eyewear device 100 also includes an image display driver 442, an image processor 412, low-power circuitry 420, and high-speed circuitry 430. The image displays of optical assemblies 180 are for presenting images, including still images, video images, or still and video images. The image display driver 442 is coupled to the image displays of optical assemblies 180 in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. The cameras 114 include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the image displays of optical assemblies 180. High-speed processor 432 may be essentially any processor capable of managing high-speed communications and operation of any general computing system. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the cameras 114A, 114B, the infrared camera(s) 410, the image processor 412, and images generated for display by the image display driver 442 on the image display of each optical assembly 180. Although the memory 434 is shown as integrated with high-speed circuitry 430, the memory 434 in other examples may be an independent, standalone element of the eyewear device 100. In some such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is to be performed.

As shown in FIG. 4, various elements of the eyewear device 100 can be coupled to the low-power circuitry 420, high-speed circuitry 430, or both. For example, the infrared camera 410 (including in some implementations an infrared emitter), the user input elements 491 (e.g., a button switch, a touchpad 181, a microphone 139), and the inertial measurement unit (IMU) 472 may be coupled to the low-power circuitry 420, high-speed circuitry 430, or both.

Figure 5:
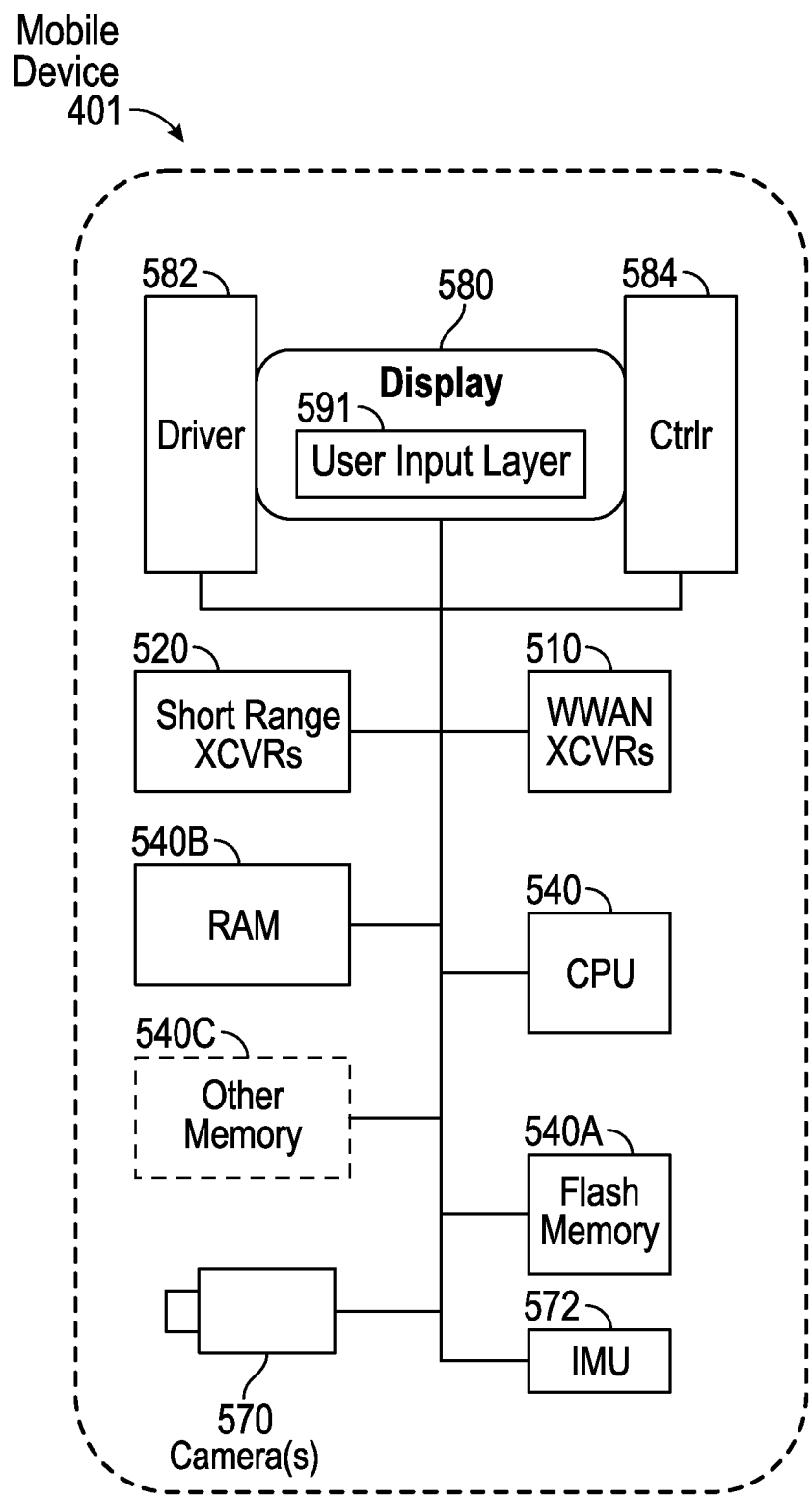
FIG. 5 is a diagrammatic representation of an example hardware configuration for a mobile device configured for use in the example communications system of FIG. 4.

As shown in FIG. 5, which is discussed if further detail below, the CPU 540 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the image displays associated with each lens or optical assembly 180 as described with reference to FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a speaker 191, or a vibrating actuator), or an outward-facing signal (e.g., an LED, a speaker 191). The image displays of each optical assembly 180 are driven by the image display driver 442. In some example configurations, the output components of the eyewear device 100 further include additional indicators such as audible elements (e.g., speakers 191), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers 191 positioned to generate a sound the user can hear, or an actuator to provide haptic feedback the user can feel. The outward-facing set of signals are configured to be seen or otherwise sensed by an observer near the device 100. Similarly, the device 100 may include an LED, a speaker 191, or an actuator that is configured and positioned to be sensed by an observer.

The user input elements 491 of the eyewear device 100 may include alphanumeric input components (e.g., a touch screen or touchpad 181 configured to receive alphanumeric input, a photo-optical keyboard, or other alphanumeric-configured elements), pointer-based input components (e.g., a mouse, a touchpad 181, a trackball, a joystick, a motion sensor, or other pointing instruments), tactile input components (e.g., a button switch, a touch screen or touchpad 181 that senses the location, force or location and force of touches or touch gestures, or other tactile-configured elements), and audio input components (e.g., a microphone 139), and the like. The mobile device 401 and the server system 498 may include alphanumeric, pointer-based, tactile, audio, and other input components.

In some examples, the eyewear device 100 includes a collection of motion-sensing components referred to as an IMU 472. The motion-sensing components may be micro-electro-mechanical systems (MEMS) with microscopic moving parts, often small enough to be part of a microchip. The IMU 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The communications system 400, as shown in FIG. 4, includes an electronic eyewear device 100 coupled to another device 800 (e.g., a head-mounted display, another eyewear device) and to a mobile device 401 over a network 495. In some implementations the other device 800 is a second electronic eyewear device 100. The other device 800 in some implementations is a different wearable device which includes components that are similar or analogous to the components of the electronic eyewear device 100, as described herein. The communications system 400 includes a memory (e.g., a non-transitory computer readable media) for storing instructions and a processor for executing the instructions. In some implementations, the memory and processing functions of the communications system 400 can be shared or distributed across the processors and memories of an eyewear device 100, the other device 800, a mobile device 401, and/or a server system 498.

In some implementations, the communications system 400 includes one or more elements or modules, referred to herein as a communications application 910, a localization system 915, an image processing system 920, and a voice recognition module 925.

The communications application 910, in some implementations, installed on an eyewear device 100 detects a prioritized speech 804 using a microphone 139. A prioritized speech 804 may include a plurality of words, sentences, and longer passages of speech. The step of sending the prioritized speech 804 in some implementations includes presenting on a display a graphic response (e.g., an audio wave animation) to provide feedback to the user that the prioritized speech 804 is being detected actively by the microphone 139.

The prioritized speech 804 is associated with a media priority 820 (e.g., relative to other media content or presentations). The communications application 910 signals the other device 800 to selectively interrupt a presentation 850 in progress on the other device 800 (e.g., a nearby portable device) according to the media priority 820, and then sends the prioritized speech 804 to the other device 800. The interruption is selective because it occurs in response to detecting a prioritized speech 804 or in response to detecting an interrupt command 902 that is associated specifically with the other device 800, and because the interruption occurs in accordance with the media priority 820. The communications application 910, in some implementations, translates the prioritized speech 804 into a select language 841 before transmitting it to the other device 800.

The localization system 915 in some implementations obtains localization data for use in determining the current position of an electronic eyewear device 100, another device 800, or a mobile device 401 relative to a physical environment 600. For example, the localization system 915 may access frames of video data 900 captured using a camera 114B to determine the current eyewear device location 840 in three-dimensional coordinates relative to the physical environment 600 (with or without reference to data from other sources, such as an inertial measurement unit or IMU 472). As used herein, the term 'frames of video data' refers to the video motion data captured using the one or more cameras 114A, 114B coupled to the eyewear device 100, including images, spatial data, and related information captured using essentially any sensor component of a camera in any form and at any sample rate. In some implementations, the localization data may be derived from the frames of motion data captured using the IMU 472, from data gathered by a GPS unit 473, or from a combination thereof.

The image processing system 920 in an example implementation generates and presents a presentation 850 (e.g., an AR experience, active noise reduction sounds, audio-visual content) on the display 882 of another device 800, as described herein.

The voice recognition module 925 in some implementations receives human speech using a microphone, converts the received speech into a digital audio signal using a sound card, transmits the digital audio signal to a processor, identifies one or more discrete words that form a command, inquiry, or other instruction, and coordinates or executes an action in accordance with the identified instruction. The voice recognition module 925 in some implementations translates the human speech into another language.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two cameras (e.g., first and second visible-light cameras with overlapping fields of view) or at least one camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In some implementations the mobile device 401 includes a microphone and a speaker. For example in the embodiment shown in FIG. 8, a mobile device (e.g., eyewear device 100) includes a microphone 139 and a speaker 191. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate accurate location coordinates, particularly when used in combination. Such location coordinates can be transmitted to the eyewear device over one or more network connections via XCVRs 510, 520.

The mobile device 401 in some examples includes a collection of motion-sensing components referred to as an inertial measurement unit (IMU) 572 for sensing the position, orientation, and motion of the mobile device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the mobile device 401 (including the acceleration due to gravity) relative to three orthogonal axes (x, y, z). The gyroscope senses the angular velocity of the mobile device 401 about three axes of rotation (pitch, roll, yaw). Together, the accelerometer and gyroscope can provide position, orientation, and motion data about the device relative to six degrees of freedom (x, y, z, pitch, roll, yaw) sometimes referred to as 6DOF. The magnetometer, if present, senses the heading of the mobile device 401 relative to magnetic north.

The IMU 572 may include or cooperate with a digital motion processor or programming that gathers the raw data from the components and compute a number of useful values about the position, orientation, and motion of the mobile device 401. For example, the acceleration data gathered from the accelerometer can be integrated to obtain the velocity relative to each axis (x, y, z); and integrated again to obtain the position of the mobile device 401 (in linear coordinates, x, y, and z). The angular velocity data from the gyroscope can be integrated to obtain the position of the mobile device 401 (in spherical coordinates). The programming for computing these useful values may be stored in on or more memory elements 540A, 540B, 540C and executed by the CPU 540 of the mobile device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the map of the environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
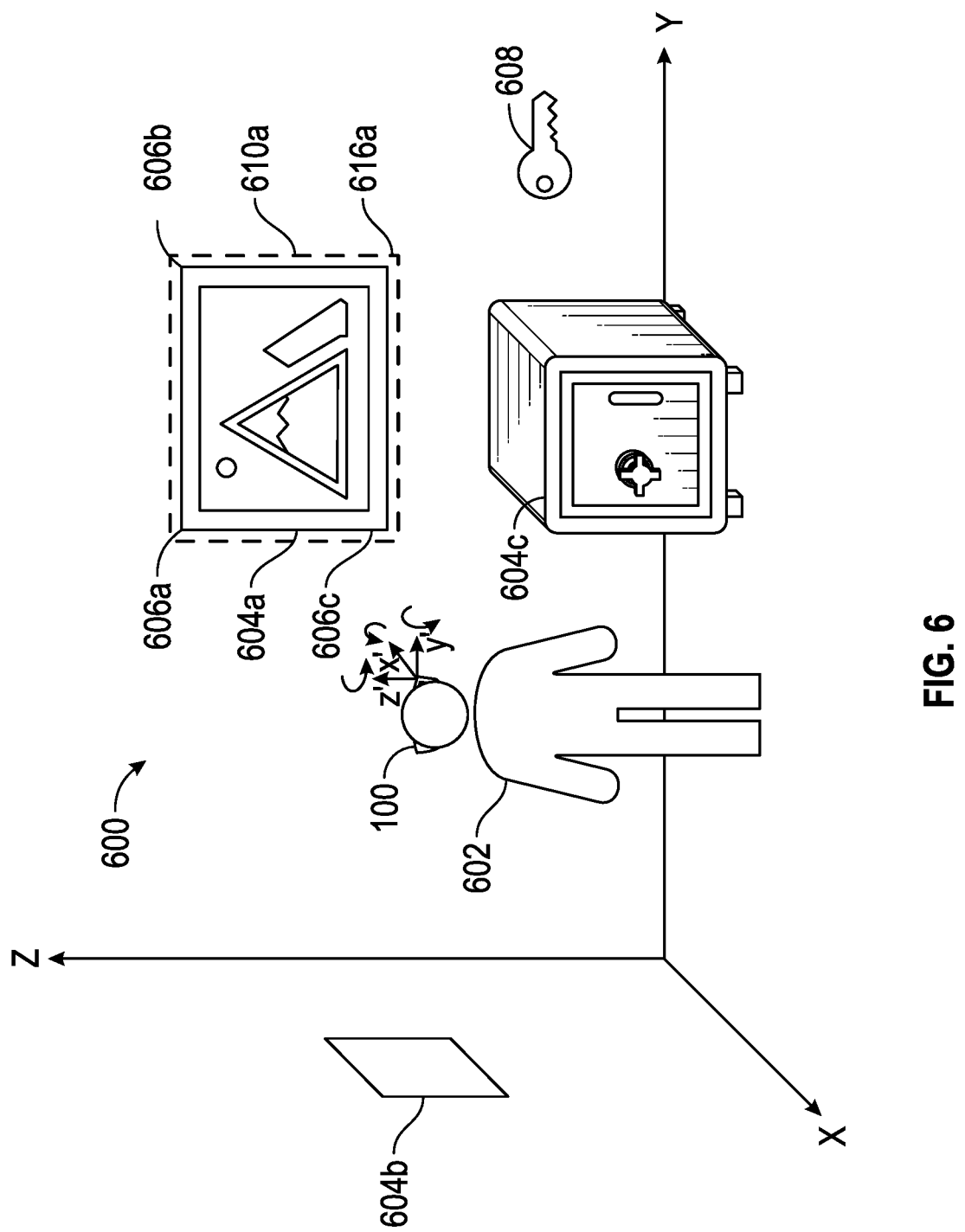
FIG. 6 is a perspective view of a user in an example environment, including physical objects and virtual objects, for reference in describing an example process known as simultaneous localization and mapping (SLAM)

FIG. 6 depicts an example physical environment 600 along with elements that are useful when using a SLAM algorithm (Simultaneous Localization and Mapping) and other types of tracking applications (e.g., natural feature tracking (NFT), hand tracking, foot tracking, etc.). A user 602 of a portable electronic device 401 (e.g., a mobile phone) and an electronic eyewear device 100 is present in an example physical environment 600 (which, in FIG. 6, is an interior room). The processor 432 of the eyewear device 100 (or the processor of the mobile phone 401) determines the position of the electronic device 100, 401 with respect to one or more physical objects 604 (e.g., including IoT objects 50) within the environment 600 using captured image data, constructs a map of the environment 600 using a coordinate system (e.g., a Cartesian coordinate system (x, y, z)) for the environment 600, and determines the position of the device 100, 410 relative to the coordinate system. Additionally, the processor in some implementations determines a precise orientation and location (x-prime, y-prime, z-prime, roll, pitch, and yaw) of the portable electronic device 401 or the eyewear device 100 within the environment by using two or more location points (e.g., three location points 606a, 606b, and 606c) associated with a single object 604a, or by using one or more location points 606 associated with two or more objects 604a, 604b, 604c. An application on the portable electronic device 401 or the eyewear device 100 may present a virtual object 608 (such as the key shown in FIG. 6) within the environment 600 for viewing on a display during an augmented reality experience.

The localization system 915 in some examples includes a virtual marker 610a associated with a virtual object 608 in the physical environment 600. In an augmented reality environment, in some implementations, markers are registered at locations in the physical environment 600 to assist electronic devices with the task of tracking and updating the location of users, devices, and objects (virtual and physical) relative to the physical environment. Markers are sometimes registered to a high-contrast physical object, such as the relatively dark object, such as the framed picture 604a, mounted on a lighter-colored wall, to assist cameras and other sensors with the task of detecting the marker. The markers may be assigned and registered in a memory by the eyewear device 100 operating within the environment. In some implementations, the markers are assigned and registered in the memory of other devices in the network.

The localization system 915 tracks physical objects and virtual objects within the physical environment 600 relative to the eyewear device 100. For a physical object 604 (e.g., the example floor safe 604c, the example IoT object 50) the localization system 915 continuously analyzes captured images of the physical environment 600 to identify the object 604 and to determine its location relative to the eyewear device 100 (e.g., by applying a SLAM algorithm). The localization system 915 maintains and updates the determined location information for the physical object 604 in memory, thereby tracking the physical object 604 as the eyewear device 100 if and when it moves through the physical environment 600. For a virtual object 608 (e.g., key) the localization system 915 establishes or designates an initial location for the virtual object 608 corresponding to a location or a physical object 604 in the environment 600 (or, in some implementations, at a location relative to the eyewear device 100). The localization system 915 maintains and updates the virtual object 608 location information, for example, in accordance with a movement algorithm associated with the virtual object 608, in response to movement of the eyewear device 100 through the environment, or a combination thereof, thereby tracking the virtual object 608 as the eyewear device 100 moves through the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of materials, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The virtual key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

Figure 7:
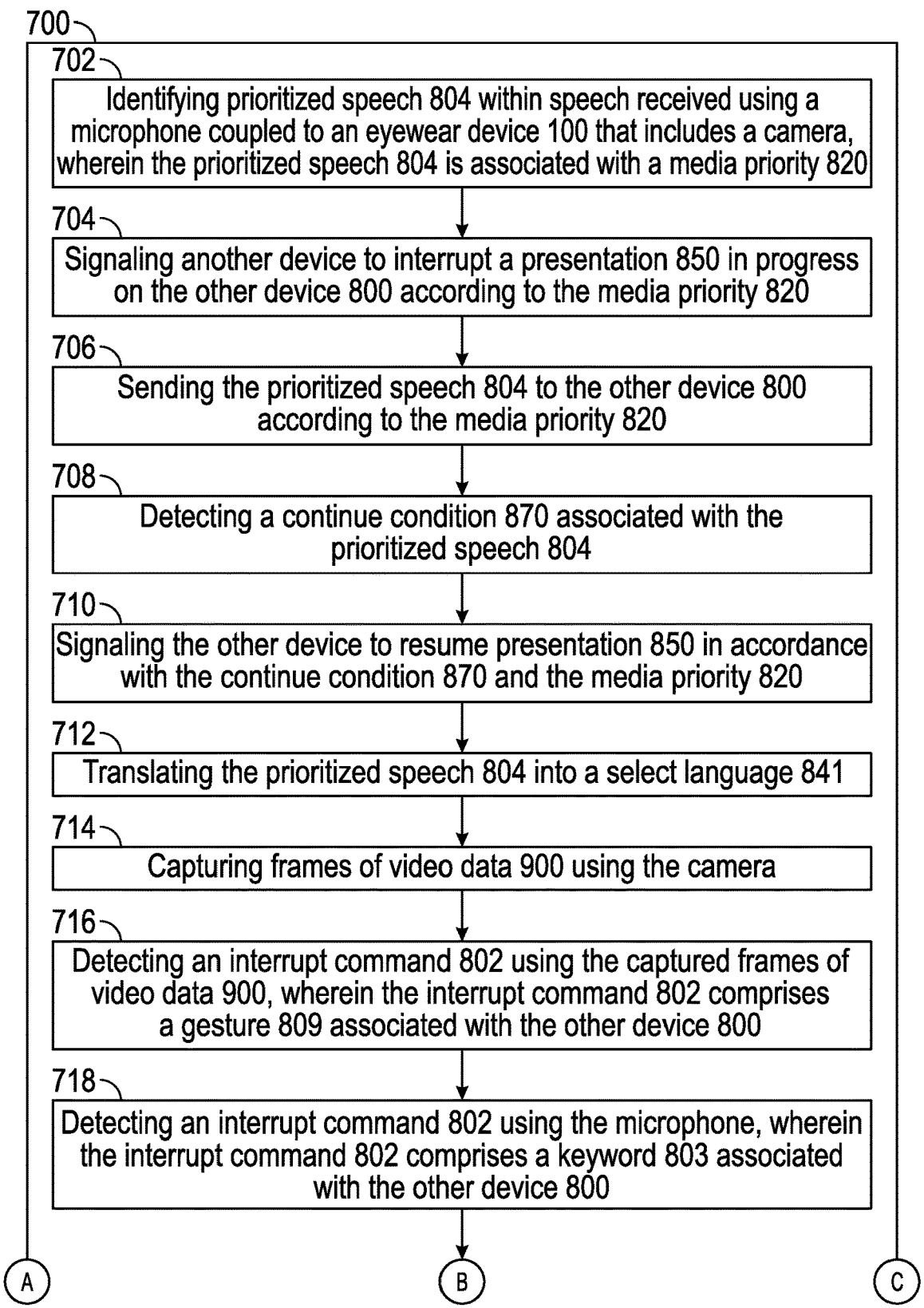
FIG. 7 is a flow chart listing the steps in an example method of controlling communications between an eyewear device and another device, which includes translating speech into a select language.
Figure 7:
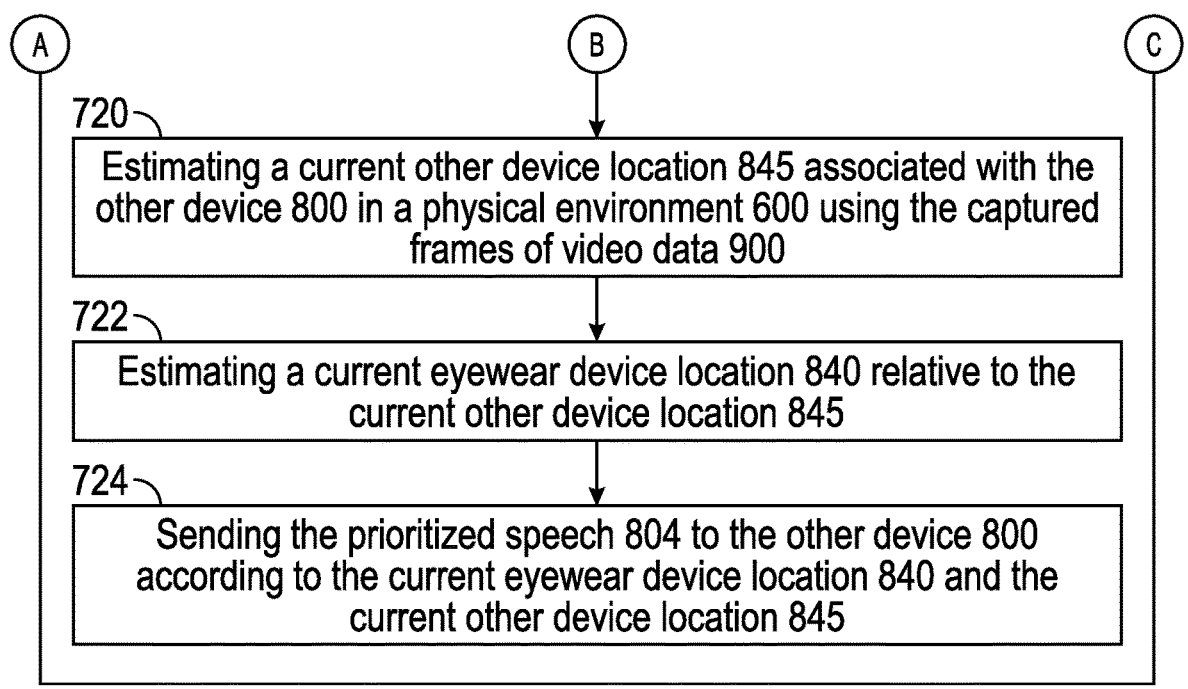

FIG. 7 depicts a flow chart 700 of an example method of controlling communications between an eyewear device 100 and another device 800. Although the steps are described in the context of an electronic eyewear device 100 transmitting a prioritized speech 804 to a nearby other device 800, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

The communications application 910 in some implementations operates on the eyewear device 100 in response to receiving a selection through a user interface (e.g., selecting from a menu, pressing a button, using a touchpad) or through some other input means (e.g., a hand gesture detected in captured images, a finger touch on the touchpad 181, a voice command).

The communications application 910 in some implementations operates on the other device 800 in response to communications with the eyewear device 100. In this example, the electronic eyewear device 100 is paired or otherwise in wireless communication with the nearby other device 800.

Block 702 in FIG. 7 recites an example step of identifying prioritized speech 804 within speech that is received using an eyewear device 100 that includes a microphone 139 and a camera 114. The communications application 910 detects the prioritized speech 804 using automatic speech recognition (ASR). The prioritized speech 804 in some implementations is associated with a media priority 820. In this aspect, the spoken content is referred to as a prioritized speech 804 because it is associated with or is assigned a relatively high media priority 820 (e.g., relative to other spoken content, presentations, AR experiences, or other media).

Figure 8:
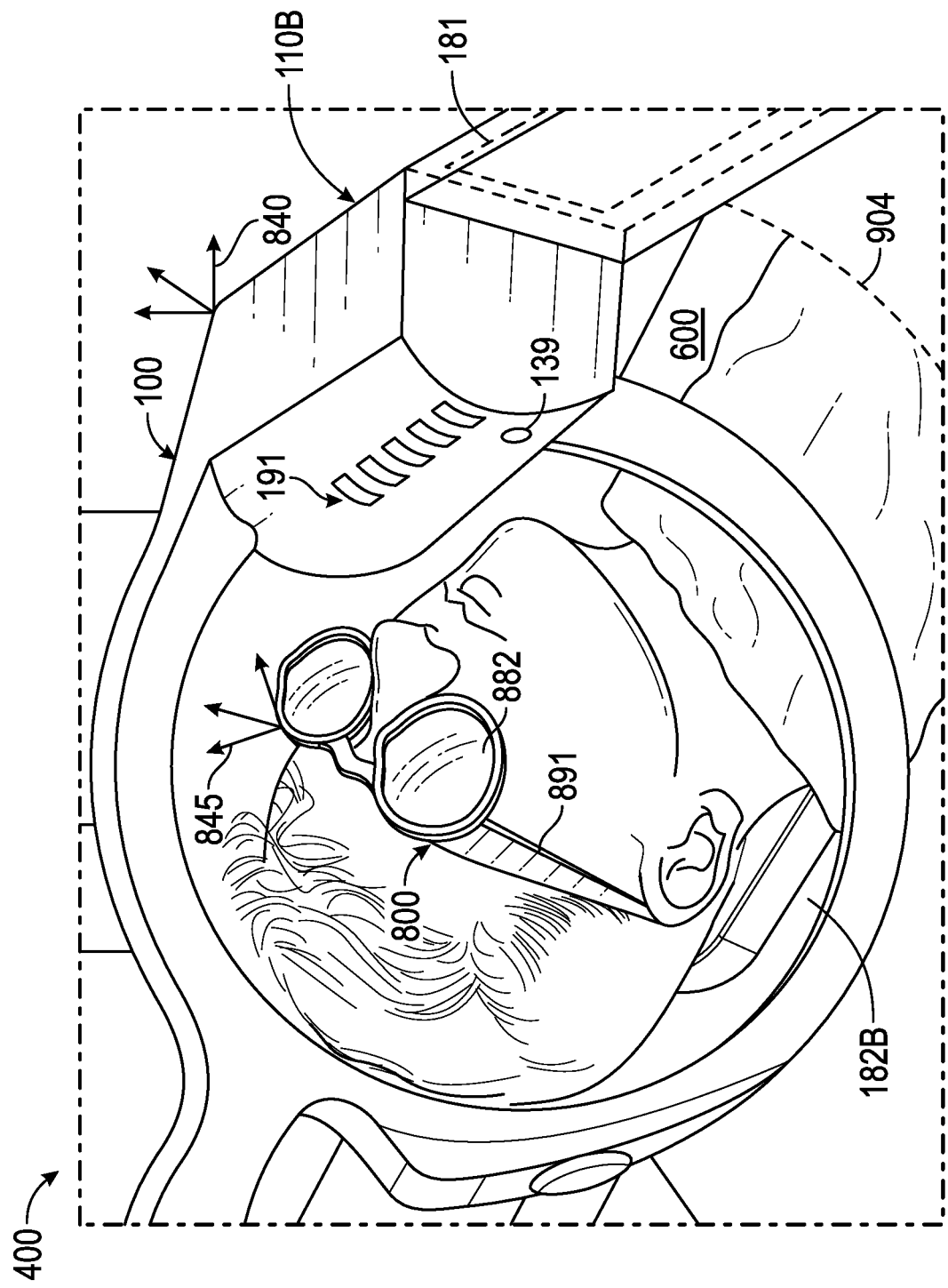
FIG. 8 is an illustration of an example communications system, including an eyewear device and another device.

FIG. 8 is an illustration of an example communications system 400 that includes an eyewear device 100 and another device 800 in a physical environment 600 (e.g., a dental office). The eyewear device 100 in this example includes a microphone 139, a speaker 191, and a display 182B. The other device 800 in this example, worn by a dental patient, includes a device speaker 891 and a device display 882. In some implementations the other device 800 is presenting or otherwise playing a presentation 850, which may include audio elements presented through the device speaker 891 and visual elements presented on the device display 882. The presentation 850 may include an augmented reality (AR) experience, a collection of active noise reduction sounds, audio content (e.g., music), visual content (e.g., video), and combinations thereof. A presentation 850 is often desired in noisy or busy environments (e.g., a busy dental office, a classroom) where there might be a great deal of noise from equipment and from talking by multiple people.

Block 704 in FIG. 7 recites an example step of signaling another device 800 to interrupt a presentation 850 in progress on the other device 800, according to the media priority 820. The media priority 820 in some implementations determines which content is presented to a user or viewer first (or instead of) other content. A relatively high media priority 820, for example, causes other low-priority content (e.g., a presentation 850 as described herein) to be paused, silenced, partially muted, delayed, or otherwise interrupted in favor of the high-priority content. In this aspect, the media priority 820 in some implementations facilitates one or more actions relative to the presentation 850, including actions such as pausing the presentation 850 (e.g., to be continued after the prioritized speech 804), silencing the presentation 850 (e.g., while it may continue to play in the background, while silenced), and partially muting the presentation 850 (e.g., allowing it to continue playing, at a reduced volume or intensity during the prioritized speech 804). The step of signaling the other device 800 to interrupt a presentation 850 in some implementations includes transmitting or presenting an indicator (e.g., a sound, a light, or other cue) to the other device 800 notifying the wearer to expect an interruption of the presentation 850 and to expect the delivery of a prioritized speech 804.

The step of signaling the other device 800 to interrupt a presentation 850 in some implementations begins after identifying the prioritized speech 804 within speech received using the microphone 130 of the eyewear device 100. The process in some implementations includes transmitting an interrupt signal from the eyewear device 100 to the other device 800.

Block 706 in FIG. 7 recites an example step of sending the prioritized speech 804 to the other device 800, for presentation on the other device 800 according to the media priority 820. For example, if the prioritized speech 804 is associated with a media priority 820 that is relatively higher than the priority associated with a presentation 850, then the prioritized speech 804 will be transmitted to and presented on the other device 800, while the lower-priority presentation 850 is paused, silenced, partially muted, delayed, or otherwise interrupted. In some implementations, the step of sending the prioritized speech 804 continues unless and until a continue condition 870 is detected.

Block 708 in FIG. 7 recites an example step of detecting a continue condition 870 associated with the prioritized speech 804. When the communications application 910 detects a continue condition 870 the step of signaling the other device 800 to resume the presentation 850 begins. The step of detecting a continue condition 870 in some implementations includes transmitting a continue signal from the eyewear device 100 to the other device 800.

The continue condition 870 in some implementations includes a spoken closing term (e.g., "End" or "OK") detected by the microphone, a quiet duration (e.g., a period of several seconds of silence during the prioritized speech 804), a closing hand gesture, or another action. For example, the continue condition 870 may include pushing a button on the eyewear device 100, tapping or otherwise interacting with a trackpad 181 or other input surface, or executing a head nod or other maneuver detectable by motion-sensing components, such as an IMU 572.

The communications application 910 in some implementations involves comparing the pixel-level data in one or more captured frames of video data 900 to a collection of hand shapes and actions (e.g., a closing hand gesture), which may be stored in a database or library. The detected hand shape data may include three-dimensional coordinates for the wrist, the bones, the joints, and other skeletal or soft-tissue landmarks which may be detected in a captured frame of video data. These data are compared to hand shape and hand action data stored in a database or library until the best match is found. In some examples, the process includes calculating the sum of the geodesic distances between the detected hand shape coordinates and a set of hand-based coordinates associated with each of a variety of hand shapes stored in the database or library. A sum that lies within a configurable threshold accuracy value represents a match. In another example implementation, the process of hand tracking involves using a machine-learning algorithm to compare the pixel-level data about the hand shape in one or more captured frames of video data to a collection of images that include hand shapes and hand actions.

In some implementations, the continue condition 870 is specifically associated with the other device 800. For example, a spoken closing term (e.g., "OK Mitchell") is specifically associated with the other device 800 currently being worn by the person named Mitchell. In an environment that includes many people wearing other devices 800, using a specifically associated continue condition 870 facilitates the re-start of the presentation 850 on a specific other device 800, while minimizing the risk of unintentionally interacting with other devices in the vicinity.

The step of detecting a closing term (e.g., a continue condition 870) in some implementations includes using a voice recognition module 925 as described herein. The voice recognition module in some implementations receives the spoken word(s) through the microphone 139, converts the word(s) into a digital audio signal, and analyzes the signal using ASR to identify the whether the word spoken matches the closing term (e.g., the continue condition 870).

Block 710 in FIG. 7 recites an example step of signaling the other device 800 to resume the presentation 850 in response to or in accordance with the continue condition 870, and in accordance the media priority 820. The continue condition 870 in some implementations includes one or more parameters that govern how the presentation 850 is resumed. For example, when resuming the presentation 850, the continue condition 870 may include instructions to gradually increase the volume, to gradually fade-in the visual content, to return to previous settings, or otherwise tailor the resume experience.

Block 712 in FIG. 7 recites an example step of translating the prioritized speech 804 into a select language 841. The communications application 910, in some implementations, translates the prioritized speech 804 from the detected language spoken by the wearer of the eyewear device 100 (e.g., the dentist) into a select language 841 best understood by or otherwise selected for the wearer of the other device 800 (e.g., the patient). In some implementations the step of translating the prioritized speech 804 includes transmitting or presenting an indicator (e.g., a sound, a light, or other cue) to the other device 800 notifying the wearer that a translation is in progress.

The example method in some implementations includes the step of detecting an interrupt command 802. In some environments (e.g., a busy dental office, a classroom) there is a great deal of noise, including talking by multiple people. The interrupt command 802 in some implementations is a spoken keyword, gesture, or other action performed by the wearer of the eyewear device 100 for the purpose of starting an interaction with another device 800. For example, the interrupt command 802 may be the name of the person (e.g., "Nathan") who is wearing the other device 800. In some implementations, the interrupt command 802 is spoken or performed before the step of identifying the prioritized speech 804. In this aspect, the process of starting an interaction begins by speaking the interrupt command 802 (e.g., saying the keyword "Nathan") and continues by speaking the prioritized speech 804 (e.g., explaining or giving instructions to Nathan). In a related aspect, the interrupt command 802 operates as a starting action which prepares or otherwise facilitates the communications application 910 to receive and process the prioritized speech 804.

In some implementations, the interrupt command 802 is associated with the other device 800. For example, the interrupt command 802 (e.g., "Nathan") is specifically associated with the other device 800 currently being worn by the person named Nathan. In some implementations, the communications application 910 facilitates the process of specifically associating a specific interrupt command 802 with a specific other device 800. In an environment that includes many people wearing other devices 800, using a specifically associated interrupt command 802 facilitates the start of a communication with a specific other device 800, while minimizing the risk of unintentionally starting an interaction with another device in the area.

FIG. 7 recites two example steps that involve the step of detecting an interrupt command 802.

Block 716 in FIG. 7 recites an example step of detecting an interrupt command 802, in cases where the interrupt command 802 includes a gesture 809. The step of detecting a gesture 809 involves capturing frames of video data 900 with the camera 114 of the eyewear device 100, as described herein, In some implementations, the step of capturing frames of video data 900 is ongoing during active use of the eyewear device 100. In other examples, the step of capturing starts in response to receiving a selection through a user interface or through some other input means. The example method in some implementations includes storing the captured frames of video data 900 in memory, at least temporarily, such that the frames of video data 900 are available for uses including processing and analysis.

The communications application 910 in some implementations involves comparing the pixel-level data in one or more captured frames of video data 900 to a collection of hand shapes and actions (e.g., a hand gesture 809 that is part of an interrupt command 802), which may be stored in a database or library. The detected hand shape data may include three-dimensional coordinates for the wrist, the bones, the joints, and other skeletal or soft-tissue landmarks which may be detected in a captured frame of video data. These data are compared to hand shape and hand action data stored in a database or library until the best match is found. In some examples, the process includes calculating the sum of the geodesic distances between the detected hand shape coordinates and a set of hand-based coordinates associated with each of a variety of hand shapes stored in the database or library. A sum that lies within a configurable threshold accuracy value represents a match. In another example implementation, the process of hand tracking involves using a machine-learning algorithm to compare the pixel-level data about the hand shape in one or more captured frames of video data to a collection of images that include hand shapes and hand actions.

Block 718 in FIG. 7 recites another example step of detecting an interrupt command 802, in cases where the interrupt command 802 includes a spoken keyword 803. In some implementations the interrupt command 802 includes pushing a button on the eyewear device 100, tapping or otherwise interacting with a trackpad 181 or other input surface, or executing a head nod or other maneuver detectable by motion-sensing components, such as an IMU 572.

The step of detecting a spoken keyword 803 (e.g., acting as an interrupt command 802) in some implementations includes using a voice recognition module 925 as described herein. The voice recognition module in some implementations receives the spoken keyword 803 through the microphone 139, converts the word(s) into a digital audio signal, and analyzes the signal using ASR to identify the whether the word spoken matches the keyword 803 (e.g., the interrupt command 802).

Block 720 in FIG. 7 recites an example step of estimating a current location 845 of the other device 800 relative to the physical environment 600 using the captured frames of video data 900. The current other device location 845 in some implementations is estimated using the localization system 915 as described herein.

Block 722 in FIG. 7 recites an example step of estimating a current eyewear device location 840 relative to the current other device location 845 using the captured frames of video data 900. The current eyewear device location 840 in some implementations is estimated using the localization system 915 as described herein.

The localization system 915 in some implementations configures the communications application 910 to obtain localization data based on the captured frames of video data 900 and, in some implementations, based on the motion data gathered by an inertial measurement unit (IMU). In some implementations, the localization system 915 constructs a virtual map of one or more objects within the camera field of view 904 using a SLAM algorithm, as described herein, updating the map and the location of objects at least as frequently as the camera captures video data 900.

The step of determining or estimating the current eyewear device location 840 relative to the other device location 845 in some implementations includes calculating a correlation between the two locations. The term correlation refers to and includes one or more vectors, matrices, formulas, or other mathematical expressions sufficient to define the three-dimensional distance between the current eyewear device location 840 and the other device location 845. Because the localization process occurs frequently, the process of correlation produces accurate and near real-time tracking of the current eyewear device location 840 relative to the other device location 845. In some implementations, the step of estimating the current eyewear device location 840 is based on the frames of motion data captured using an IMU, or on the frames of video data 900 captured using a camera, or a combination of both.

Block 724 in FIG. 7 recites an example step of sending the prioritized speech 804 to the other device 800 according to the eyewear device location 840 and the other device location 845. In some implementations, the step of sending the prioritized speech 804 to the other device 800 occurs when the eyewear device 100 (at device location 840) is within a threshold proximity of the other device 800 (at other device location 845). The relative locations 840, 845 are illustrated in FIG. 8. In this example, the communications application 910 sends the prioritized speech 804 on the other device 800 when it is located within range of the eyewear device 100. In an environment that includes many people wearing other devices 800, using the proximity between devices 100, 800 facilitates communications with a specific other device 800 that is nearby, while minimizing the risk of unintentionally interacting with other devices that are in the area but not within a predefined and configurable proximity.

As shown in FIG. 8, the eyewear device 100 is relatively near the other device 800, which can be seen through the semi-transparent display 182B of the eyewear device 100. In some implementations, the communications application 910 transmits and presents the prioritized speech 804 on the other device 800 when it is located within the field of view 904 of the camera coupled to the eyewear device 100.

Any of the functionality described herein for the eyewear device 100, the other device 800, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible/non-transitory storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions/program code to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling communications between an eyewear device in wireless communication with another device, wherein the eyewear device comprises a localization system, a microphone and a camera, the method comprising:
 capturing frames of video data using the camera;
 estimating a current other device location associated with the other device using the frames of video data;
 determining, using the localization system, device location relative to the current other device location;
 calculating a current proximity based on the eyewear device location relative to the current other device location;
 receiving speech using the microphone;
 identifying prioritized speech within the received speech, wherein the prioritized speech is associated with a threshold proximity and a media priority;

signaling the other device to interrupt a presentation in progress on the other device according to the current proximity relative to the threshold proximity;
sending the prioritized speech to the other device for presentation according to the current proximity;
detecting a continue condition associated with the prioritized speech; and
signaling the other device to resume the presentation in accordance with the continue condition.

2. The method of claim 1, wherein sending the prioritized speech further comprises:
translating the prioritized speech into a select language; and
sending the prioritized speech to the other device in the select language.

3. The method of claim 1, further comprising:
detecting an interrupt command using the frames of video data, wherein the interrupt command comprises a gesture associated with the other device; and
sending the prioritized speech to the other device in accordance with at least one of the interrupt command or the media priority.

4. The method of claim 1, further comprising:
detecting an interrupt command using the microphone, wherein the interrupt command comprises a keyword associated with the other device; and
sending the prioritized speech to the other device in accordance with at least one of the interrupt command of the media priority.

5. The method of claim 1, wherein the media priority further comprises an action to be executed on the other device, wherein the action is selected from the group consisting of pausing the presentation, silencing the presentation, and partially muting the presentation.

6. The method of claim 1, wherein the continue condition comprises an input detected using the eyewear device, wherein the input is selected from the group consisting of a closing term detected using the microphone, a quiet duration detected using the microphone, and a closing gesture detected using the camera.

7. The method of claim 1, wherein the presentation is selected from the group consisting of an augmented reality experience, a virtual reality experience, active noise reduction sounds, games, audio content, and visual content.

8. An electronic eyewear device comprising:
a microphone,
a camera,
a display,
a processor; and
a memory including instructions, wherein the instructions, when executed by the processor, configure the electronic eyewear device to:
capture frames of video data using the camera;
estimate a current other device location associated with the other device using the frames of video data,
determine an eyewear device location relative to the current other device location;
calculate a proximity based on the eyewear device location relative to the current other device location;
receive speech using the microphone;
identify a prioritized speech within the received speech, wherein the prioritized speech is associated with a threshold proximity and a media priority;
signal another device to interrupt a presentation in progress on the other device according to the current proximity relative to the threshold proximity;
send the prioritized speech to the other device according to the current proximity;
detect a continue condition associated with the prioritized speech; and
signal the other device to resume the presentation in accordance with the continue condition.

9. The electronic eyewear device of claim 8, wherein the instructions further configure the electronic eyewear device to:
translate the prioritized speech into a select language; and
send the prioritized speech to the other device in the select language.

10. The electronic eyewear device of claim 8, wherein the instructions further configure the electronic eyewear device to:
detect an interrupt command using the captured-frames of video data, wherein the interrupt command comprises a gesture associated with the other device; and
send the prioritized speech to the other device in accordance with at least one of the interrupt command or the media priority.

11. The electronic eyewear device of claim 8, wherein the instructions further configure the electronic eyewear device to:
detect an interrupt command using the microphone, wherein the interrupt command comprises a keyword associated with the other device; and
send the prioritized speech to the other device in accordance with at least one of the interrupt command or the media priority.

12. The electronic eyewear device of claim 8, wherein presenting the prioritized speech according to the media priority further comprises:
performing an action to be executed on the other device, wherein the action is selected from the group consisting of pausing the presentation, silencing the presentation, and partially muting the presentation.

13. The electronic eyewear device of claim 8, wherein detecting a continue condition associated with the prioritized speech further comprises:
detecting an input using the eyewear device wherein the input is selected from the group consisting of a closing term, a quiet duration, and a closing gesture.

14. A non-transitory computer readable medium, storing instructions for controlling communications between an electronic eyewear device in wireless communication with another device, wherein the eyewear device comprises a microphone, a camera, a localization system, a processor, and a memory, and wherein the instructions, when executed by the processor, configure the electronic eyewear device to perform functions, the functions including:
capturing frames of video data using the camera;
estimating a current other device location associated with the other device using the frames of video data;
determining, using the localization system, a eyewear device location relative to the current other device location;
calculating a current proximity based on the eyewear device location relative to the current other device location;
receiving speech using the microphone;
identifying prioritized speech within the received speech, wherein the prioritized speech is associated with a threshold proximity and a media priority;
translating the prioritized speech into a select language;

signaling the other device to interrupt a presentation in progress on the other device according to the current proximity relative to the threshold proximity;

sending the prioritized speech to the other device in the select language according to current proximity;

detecting a continue condition associated with the prioritized speech; and signaling the other device to resume the presentation in accordance with the continue condition.

15. The non-transitory computer readable medium of claim 14, wherein the instructions, when executed, further configure the electronic eyewear device to perform the functions of:

detecting an interrupt command using the frames of video data, wherein the interrupt command comprises a gesture associated with the other device; and detecting an interrupt command using the microphone, wherein the interrupt command comprises a keyword associated with the other device; and sending the prioritized speech to the other device in accordance with at least one of the interrupt command or the media priority.

16. The non-transitory computer readable medium of claim 14, wherein the function of presenting the prioritized speech according to the media priority further comprises:

performing an action to be executed on the other device, wherein the action is selected from the group consisting of pausing the presentation, silencing the presentation, and partially muting the presentation.

17. The non-transitory computer readable medium of claim 14, wherein the function of detecting a continue condition associated with the prioritized speech further comprises:

detecting an input using the eyewear device, wherein the input is selected from the group consisting of a closing term, a quiet duration, and a closing gesture.

* * * * *